Aug. 2, 1966  F. L. BISHOP  3,264,077
METHOD AND APPARATUS FOR SEVERING MOLD CHARGES OF MOLTEN GLASS
Filed April 18, 1962  3 Sheets-Sheet 1
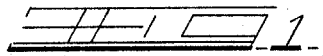
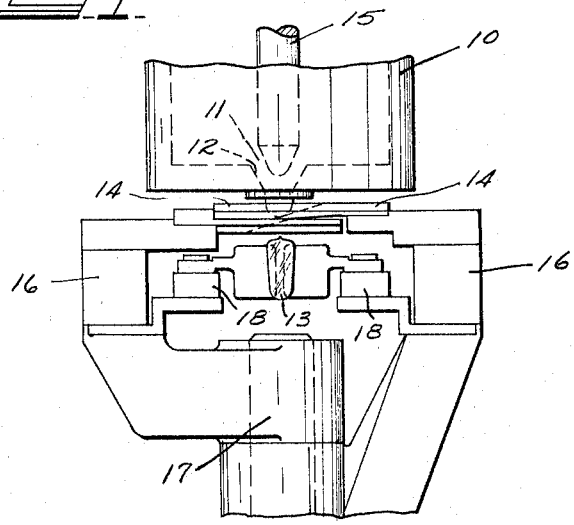
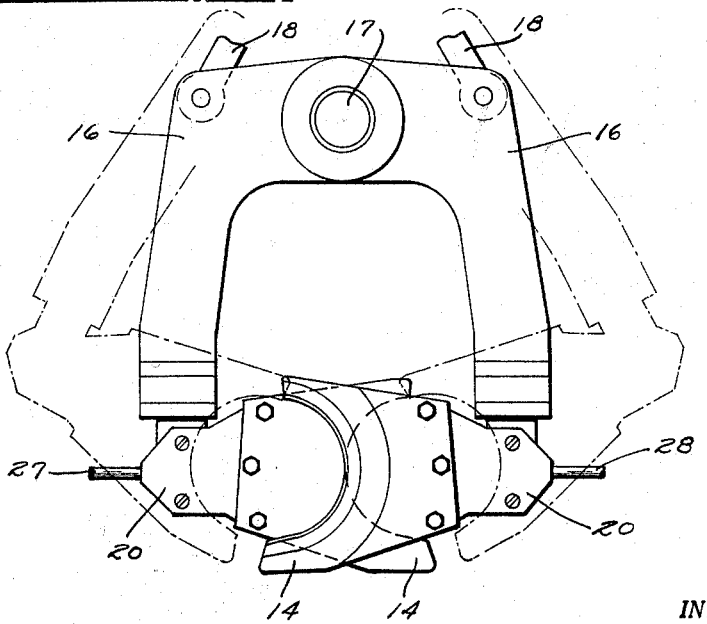
INVENTOR.
FREDERIC L. BISHOP
BY
E. J. Holler &
W. A. Schaich
ATTORNEYS Aug. 2, 1966  F. L. BISHOP  3,264,077
METHOD AND APPARATUS FOR SEVERING MOLD CHARGES OF MOLTEN GLASS
Filed April 18, 1962  3 Sheets-Sheet 2
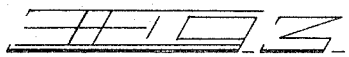
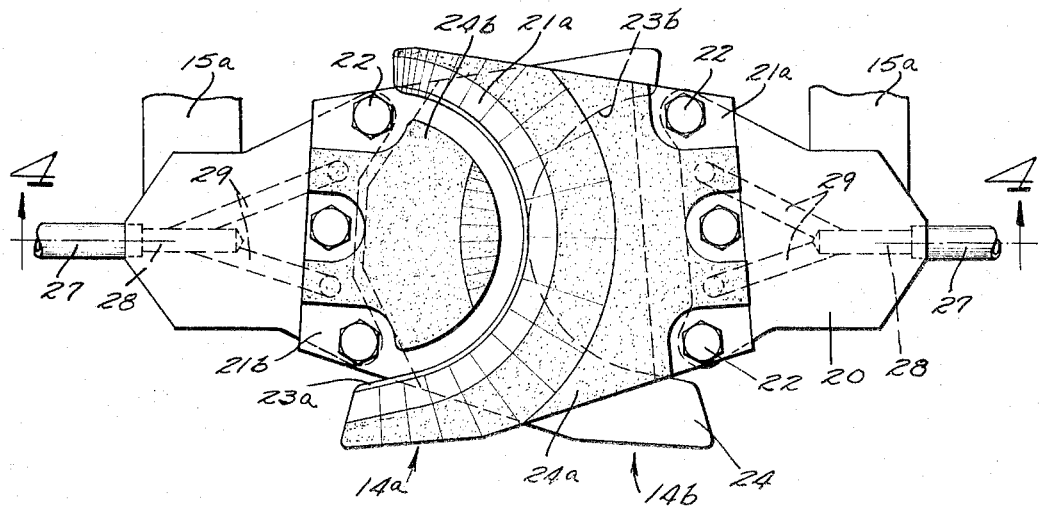
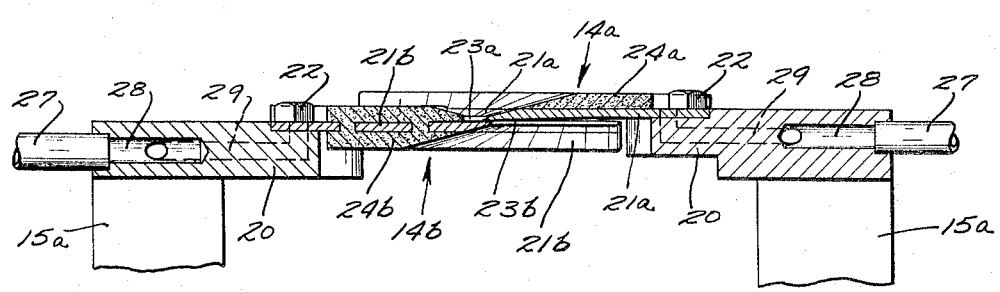
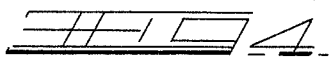
INVENTOR.
FREDERIC L. BISHOP
BY E. J. Holler &
W. A. Schaich
ATTORNEYS

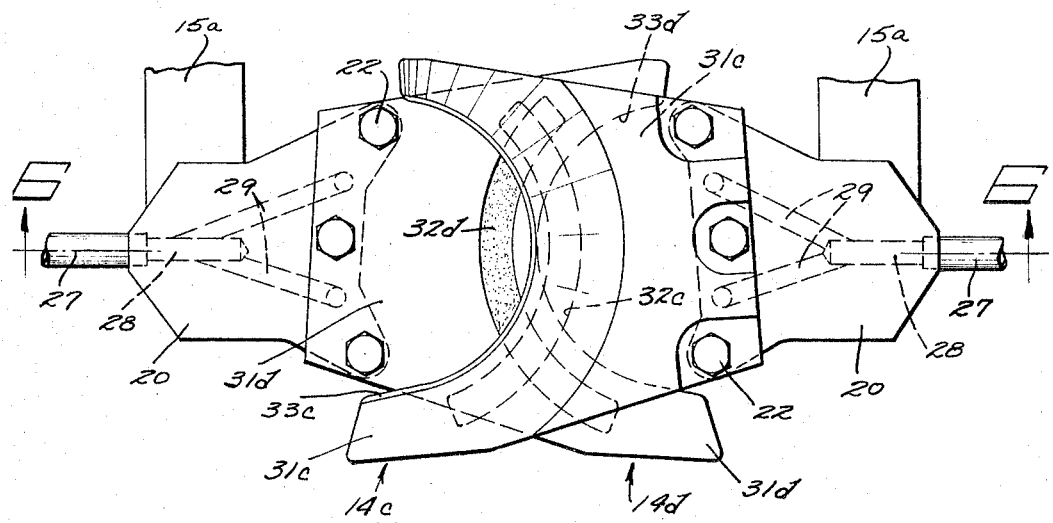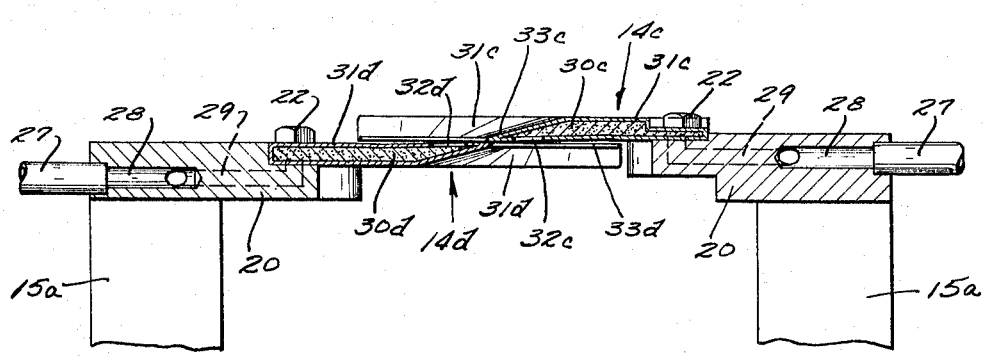

United States Patent Office 3,264,077
Patented August 2, 1966

3,264,077
METHOD AND APPARATUS FOR SEVERING MOLD CHARGES OF MOLTEN GLASS
Frederic L. Bishop, Toledo, Ohio, assignor, by mesne assignments, to Owens-Illinois Glass Company, Toledo, Ohio, a corporation of Ohio
Filed Apr. 18, 1962, Ser. No. 188,375
4 Claims. (Cl. 65—24)

The present invention relates to method and apparatus for severing molten or plastic material at a high temperature. More specifically, the invention pertains to shear mechanism and method of shearing particularly adapted to severing mold charges or gobs of glass in molten or thermoplastic condition as the glass issues from a supply body.

In the manufacture of various types of molded glass articles, it is common practice to flow the molten glass through a bottom outlet of a feeder integrally connected with the forehearth of a furnace tank. The glass as it issues, under the control of suitable gob-forming mechanism, is suspended from the walls of the outlet orifice. The glass is periodically severed beneath the orifice into individual mold charges or gobs which are guided or permitted to drop into forming molds.

Ordinarily the gobs are severed by a pair of heat-resistant shears having U-shaped or V-shaped cutting edges which, as the shears are moved together into overlapping relation, surround and sever the suspended glass. Normally the surface of the glass issuing downwardly into the open air is immediately chilled forming a sack or skin-like layer of chilled glass which envelopes the gob. During the severing operation utilizing conventional shears, their cutting edges contact the glass at spaced intervals around the body of glass. As the glass is severed gradually by the shear blades moving toward each other, a squeezing of the glass occurs in such manner as to cause the formation of wrinkling or uneven chilling of the surface layer of the chilled surface skin or exterior layer. The occurrence of such wrinkling or uneven chilling of the surface layer may appear as a defect in the finished ware and is to be avoided. Also any pronounced defects or marked thermal imbalance in the cutting edges of the shear blades result in uneven severing of the gob producing further imperfections therein.

Heretofore, it has been common practice to cool and lubricate each of the shear blades by spraying their surfaces with a suitable fluid while the blades are in retracted position. Both stationary and movable spray nozzles are utilized to apply the fluid exteriorly while the shear blades are stationarily maintained in retracted position and/or during an interval of their moving into and out of such position. Normally the spray nozzles cannot be conveniently carried along with the shears into the path of the issuing molten glass, and at the required high rates of gob severance, the length of time during which the lubricating and cooling spray can be applied is considerably limited. Available spraying time becomes shorter with greater speeds of operation of the shear mechanism as the requirement of additional lubrication and cooling of the blades increases. During such high speed operation the spraying is frequently inadequate which causes the gob severing operation of the shear mechanism to become defective or erratic. The life of the blades is thus considerably shortened due to overheating and excessive amounts of spraying materials are required in order to maintain the shears in satisfactory operating condition.

Thus while the molten glass must be severed in such manner as to avoid undue chilling and wrinkling of the gob surface layer which results in defects in the finished product, the severing must be uniformly accomplished during widely varying rates of gob delivery. Therefore, the shear blades must be lubricated and thermally controlled within precise limits to protect their cutting edges to ensure their long-term durability and positive action.

Accordingly, it is an object of the present invention to provide method and apparatus for severing plastic or molten material while overcoming and eliminating the aforesaid objections to provide adequate lubricating and cooling of individual shear blades while operating at high frequency and elevated temperature. The invention provides shear blades which are combined with suitable shearing mechanism in a manner to swing or move the blades during the shearing operation while delivering a fluid lubricant continuously adjacent and onto their cutting edge portions. The apparatus includes a plurality of cooperative shear blades each having essentially an imperforate cutting edge and a perforate body portion with interconnecting means for delivering a fluid lubricant into the perforate body portion for its external emission and distribution onto exterior surfaces of the shear blade. In the attainment of the objects of this invention, the shears may have various specially-contoured cutting edges for contacting selected portions or the entire perimeter of the glass during its severance.

Another object of this invention is to provide shear mechanism comprising a plurality of shear blades which are adapted to continuous and high speed operation with cooling and lubricating means comprising an integral component part of each shear blade.

Another object of this invention is to provide a shear mechanism consisting of a cooperative pair of self-lubricating and self-cooling shear blades which are adapted to severing suspended mold charge bodies to obtain complete and clean severance of every charge during long-term campaigns.

Another object of this invention is to provide a method of shearing mold charges or gobs of molten glass while continuously suppliyng a fluid lubricant to the cutting edge portion of each shear blade, the lubricant being supplied internally of the body portion of each blade for its distributed discharge from extensive external surfaces of each blade.

A still further object of this invention is to provide a method of severing mold charge bodies by closing a pair of self-lubricating and self-cooling shear blades edgewise to cut through a suspended column of molten glass and providing a fluid lubricant externally and continuously to each shear blade from internally thereof.

Referring to the accompanying drawings which illustrate the invention as used in connection with a conventional form of glass feeding and shearing mechanism:

FIG. 1 is a side elevational view of the apparatus;

FIG. 2 is a plan view of the apparatus, the shears being shown in full lines in their closed overlapping position and in broken lines in their retracted position;

FIG. 3 is an enlarged plan view of one embodiment of the subject shear blades in their closed position;

FIG. 4 is a vertical sectional view taken along line 4—4 of FIG. 3;

FIG. 5 is a view similar to FIG. 3 illustrating a modification of the invention; and FIG. 6 is a view taken along the line 6—6 of FIG. 5.

Referring to FIG. 1, the glass feeder comprises a forehearth 10 into which molten glass flows from a melting and refining tank (not shown). The forehearth is formed with a well 11 and a bottom outlet orifice 12 through which the molten glass 13 issues. The issuing glass 13 is suspended in the form of gobs or mold charges. Delivery of the gobs is controlled by a vertically reciprocating plunger 15 disposed in vertical alignment with outlet orifice 12. The plunger is reciprocated in a conventional manner in cooperation with the movements of shear blades 14.

As shown in FIGS. 1 and 2 a pair of shear blades 14 is carried on shear arms 16 mounted on a vertical pivot pin or post 17. The shears are connected to swing in unison by a pair of operating arms 18. The shears may be swung-to-and-from their retracted position (as shown in dotted lines in FIG. 2) to the severing or closed position by operating arms 18 which are pivoted to connect to a rock arm or intermeshing gears (not shown). The gob feeding and shearing apparatus as above detailed in general terms is well known in the art. In FIG. 2 the shear arms and blades are shown in full lines in their closed position at the completion of the severing stroke.

As shown in FIGS. 3 and 4 each of the shear blades 14a and 14b is comprised of a support member 20 which is rigidly affixed to the freely-projecting cantilevered end 15a of each shear arm 16. Each shear blade 14a and 14b has a body portion 21a and 21b which is rigidly connected to its respective support member 20 by a series of spaced-apart machine bolts 22 or other connecting devices.

FIGS. 3 and 4 illustrate on the right-hand side thereof shear blade 14a having a body portion 21a which consists of a flat plate having a generally frusto-pyramidal configuration in plan. The narrower side of body portion 21a interconnects with support member 20 and its larger side terminates in a concavely-shaped shearing edge portion 23a preferably having a U-shaped contour.

A continuous layer or coating of porous material 24a is arranged on the upper surface of blade body portion 21a. The latter serves to support and provide a base for the porous material 24a. The porous material extends over the major upper external surfaces of body portion 21a adjacent to and surrounding the concave tapering cutting edge 23a. Cutting edge 23b is formed of imperforate essentially solid material.

An inlet line 27 interconnects with an opening 28 in blade support member 20 and is connected to a pressurized fluid lubricant such as water, hydrocarbon oil or other liquid. The opening 28 extends substantially coaxially with the body portion of blade 14a and connects with a pair of bifurcated openings 29 which lead into openings formed in blade body portion 21a.

The openings adjacent a supported portion of body portion 21a extend into a localized region of porous material 24a to supply the fluid lubricant in pressurized form thereinto. Passages 29 open into the underside of porous material 24a for conducting the fluid thereinto for its distributed discharge over extensive upper surfaces of the porous material.

Shear blade 14b shown on the left-hand side of FIGS. 3 and 4 has a configuration generally similar to that of blade 14a. Its narrower side interconnects with support member 20 and its larger side terminates in a similarly-shaped concave shearing edge portion 23b. Blade 14b is located in a plane immediately below blade 14a with their cutting edges residing in essentially the same plane to achieve a cooperative shearing action. Body portion 21b of blade 14b is connected to support member 20 by means of a series of machine bolts 22. Body portion 21b has a series of intermediate openings therein and is coated exteriorly on both its upper and lower surfaces with a layer of porous material 24b. The porous material extends above and below body portion 21b and terminates short of the imperforate essentially solid shearing edge 23b.

The porous material 24a and 24b utilized to form the fluid conducting portion of each shear blade preferably consists of porous metal such as bronze or stainless steel. Porous metals having a porosity of about 30 to 50 percent capable of passage of gasses or liquids therethrough are particularly applicable to practicing the present invention and a porosity of about 40% is preferred.

An inlet line 27 interconnects with an opening 28 in support member 20. A pair of bifurcated openings 29 extend from opening 28 into spaced openings in the underside of blade body portion 21b. Openings 29 extend into the porous material 24b for the introduction of pressurized fluid thereinto. Both shearing edges 23a and 23b terminate in tapered essentially solid heat-resistant material with the edges having generally similar arcuate contours. The blades are adapted to engagement in slightly overlapping relation to completely and cleanly sever the molten glass. The cutting edges of both blades are similarly concave and form substantially the arc of a circle.

Another embodiment of the present invention is shown in FIGS. 5 and 6. A pair of shear blades 14c and 14d are supported on individual support members 20 by a series of machine bolts 22. Blades 14c and 14d have generally the same configuration as the embodiment shown in FIGS. 3 and 4. Shear blade 14c shown on the right-hand side of FIGS. 5 and 6 is fabricated of porous material 30c and preferably of porous metal such as bronze or stainless steel having a porosity of about 40%. An imperforate heat-resistant coating 31c is deposited over essentially all surfaces of porous material 30c on both its upper and lower regions. An arcuate pattern 32c on the under side of the blade 14c remains uncoated with the porous material exteriorly exposed facing downwardly. A pair of bifurcated fluid-conducting passages 29 extend into porous material 30c for introducing pressurized fluid thereinto. The arcuate opening 32c in the under side of shear blade 14c permits the external discharge of a pressurized fluid therefrom in an arcuate pattern adjacent the shearing edge portion 33c Shear blade 14d is similar to shear blade 14c comprising an inner core of porous material 30c having a coating of imperforate heat-resistant material 31e over its exterior surfaces. An arcuate opening 32d is formed in an upper surface of the external coating 31c on blade 14d, the inner porous material 30c being exteriorly exposed adjacent the blade shearing edge 33b. Fluid conducting passages 29 extend through support member 20 and the imperforate coating 31d into porous material 30c.

Thus, the pair of shear blades each having an inner core of porous metallic material such as bronze or stainless steel having a porosity of about 40% can be utilized continuously. Their individual extensive surface areas adjacent the cutting edges are maintained cool and at the proper working temperature by the introduction of the cooling liquid thereinto, the cooling liquid consisting of water, aqueous mixtures of water-soluble oils or hydrocarbon lubricating oils as desired. Steam can also be used as desired to maintain the shearing edges at the proper working temperature. A wide range of suitable fluids can be injected through the porous metal of the blades and can be conveniently controlled.

In the case of utilizing either liquid or gaseous coolants introduced through the porous portion of the blade, a gas film serves to keep a major portion of the blade adjacent the cutting edge in thermally balanced condition for repeated severing operations at high rates of mold charge severance. The cutting edges may be comprised of noble metal such as rhodium, although other high-melting thermally resistant materials such as titanium carbide or boron nitride can also be employed.

The present method of severing mold charges from a suspended body of molten glass comprises closing the subject shear blades edgewise to cut through the suspended body from the sides thereof. A fluid lubricant is provided continuously to the exterior surfaces of each shear blade internally or contiguous with its body portion. The fluid lubricant is introduced internally under pressure into a porous portion of the shear blade and the fluid lubricant is discharged at an exteriorly exposed area of the porous material portion of substantial dimensions adjacent the cutting edge of the blade. The fluid lubricant is distributed exteriorly as a thin film to maintain the solid imperforate edge cutting portion of the blade at the desired working temperature. The rate of ejecting the fluid lubricant exteriorly from the porous body portion of the blade is controlled within proper limits to maintain the shearing edge at the desired working temperature. The shearing edges should be maintained at a temperature such that the areas of the blade which contact the glass are not deleteriously effected by overheating and at a temperature below which the metal changes its chemical or physical characteristics.

It has been found that the normal life of shear blades can be extended to three or more times their normal life-span where the blades are cooled and lubricated in accordance with the present invention. The shear blades are able to maintain a sharp cutting edge without defects occurring therein for substantially longer periods than heretofore obtainable. The application of the coolant to closely adjacent the cutting edge serves to protect the body portion of the blade by an insulating gaseous film so that the molten glass charge does not contact substantial surface areas of the blades themselves.

Various modifications may be resorted to within the spirit and scope of the present invention.

I claim:

1. A shear mechanism for severing molten material at elevated temperatures such as molten glass and the like comprising a pair of shear blades mounted for movement in a shearing plane to a closed position in which said shear blades overlap and to an open position in which said shear blades are separated, each of said shear blades having a thin shearing edge portion comprised of heat-resistant solid material and a body portion comprised of porous material extending adjacent said edge portion and having at least partially exposed surfaces, and means for internally introducing a fluid lubricant into the porous body portion of each of said shear blades for its distributed discharge from said exposed surfaces.

2. A shear mechanism in accordance with claim 1, wherein said body portion of each shear blade has an internal supporting structure comprised of rigid substantially imperforate material and a substantial majority of its external surfaces comprised of rigid porous material.

3. A shear mechanism in accordance with claim 1 wherein said body portion of each shear blade is comprised internally of porous heat-resistant materials with an exterior coating of imperforate heat-resistant material extending over its major external surfaces, said porous material being exposed exteriorly at least at limited surface areas adjacent said shearing edge portion of each shear blade.

4. A shear mechanism in accordance with claim 1 wherein said means for introducing said fluid lubricant comprises at least one inlet source inter-connecting with said porous body portion of each shear blade to deliver said fluid lubricant internally thereof for its distributed discharge from exposed surfaces of said porous material.

References Cited by the Examiner

UNITED STATES PATENTS

| 778,023 | 12/1904 | Fells | 30—123.3 |
| 1,760,255 | 5/1930 | Peiler | 65—170 |
| 2,143,096 | 1/1939 | Wadsworth | 65—170 |
| 2,153,443 | 4/1939 | Wellnitz | 65—170 |

FOREIGN PATENTS 69,427 7/1958 France.

DONALL H. SYLVESTER, *Primary Examiner.*

G. R. MYERS, *Assistant Examiner.*